Dec. 22, 1970  A. Q. LUNDQUIST  3,549,351
METHOD AND APPARATUS FOR GAS-SOLIDS REACTION IN PRODUCTION
OF SULFUR, IRON AND RELATED PRODUCTS
Filed Jan. 16, 1968  2 Sheets-Sheet 1

INVENTOR.
Adolph Q. Lundquist
BY
McGrew & Edwards
ATTORNEYS

United States Patent Office 3,549,351
Patented Dec. 22, 1970

3,549,351
METHOD AND APPARATUS FOR GAS-SOLIDS REACTION IN PRODUCTION OF SULFUR, IRON AND RELATED PRODUCTS
Adolph Q. Lundquist, Golden, Colo., assignor to Hy-Met Engineering, Ltd., Denver, Colo., a corporation of Colorado
Filed Jan. 16, 1968, Ser. No. 698,270
Int. Cl. C21b 1/04
U.S. Cl. 75—6          11 Claims

ABSTRACT OF THE DISCLOSURE

Apparatus and method for promoting controlled gas-solids reaction in elongated treatment zone utilizing vibratory action for impelling progressive movement of charge and separating discrete particles of charge in each increment of applied forces with reactive gas introduced in starvation amount at spaced points along course of movement entering spaces between separated particles. Support surface of reaction zone provides controlled heat transfer during reaction and movement rate induced by vibratory action determines solids retention time in treatment zone. Treatment suitable for chlorination, sulfation, oxidation and reduction. Iron pyrites treatment for iron and elemental sulfur recovery at low cost.

---

This invention relates to a process for inducing controlled reactions between solids and gases and more particularly relates to processes for recovering metallic constituents from sulfide and complex oxide ores and concentrates.

Many minerals and other valuable materials are separated and recover from associated matter of their formation by chemical processing, including chlorination, sulfation, oxidation and reduction or roasting. Efficient treatment of finely divided solids is difficult in either batch or continuous treatments whenever solids products of reaction are formed with the reactive gases. Also, when exothermic reactions are produced inducing fast temperature changes, it is common practice to control excessive temperature increases by dilution of the reactive gases which slows the reaction. Quenching media also are used for the same purpose. Either control increases the retention time in the apparatus used in the treatment requiring larger size equipment to produce the requisite completed reaction.

The present invention is based on the discovery that control of the temperature rate of heat transfer, rate of contact and retention time in inducing reactions between finely divided solids and reactive gases in a closed gas-solids contactor of novel arrangement and functioning provides an economical and efficient method of eliminating the interference of solid products of reaction and of inhibiting undesirable reaction between unreacted solids and reactive gases. One of the innovations of said treatment is the use of the novel apparatus to provide intimate contact between finely divided solids and gas in a manner which allows immediate heat transfer to or from the solids and also allows immediate controlled reactions without the necessity of dilution.

Accordingly, it is an object of my invention to provide a continuous method of subjected a charge of finely divided solids to a progressive impelling movement through a closed reaction zone of novel type providing intimate contact between individual solids particles of the moving charge and reactive gases introduced into said zone at selected points and in controlled volume with temperatures controlled throughout the reaction zone so as to provide immediate controlled reactions without the necessity of gas dilution as the solids charge progresses through the reaction zone to final discharge as an essentially gas-free solids material.

A further object of my invention is to provide a simple, economic and efficient process for recovering metallic constituents from sulfide or oxide ores and concentrates.

Yet another object of my invention is to provide a simple, economic and efficient process for recovery of high purity sulfur and iron from iron pyrites.

A still further object of my invention is to provide a multi-stage treatment of sulfide ores or concentrates, including a chlorination stage in which the chlorine input requirement is filled by chlorine evolved in another stage of the treatment.

Other objects reside in novel steps and procedures in inducing and controlling gas-solids reactions.

Typical apparatus arrangements and functioning and typical circuiting practices have been illustrated in the accompanying drawings and will now be described. In the drawings, in the several views of which like parts and stages bear similar reference numerals:

Figure 1:
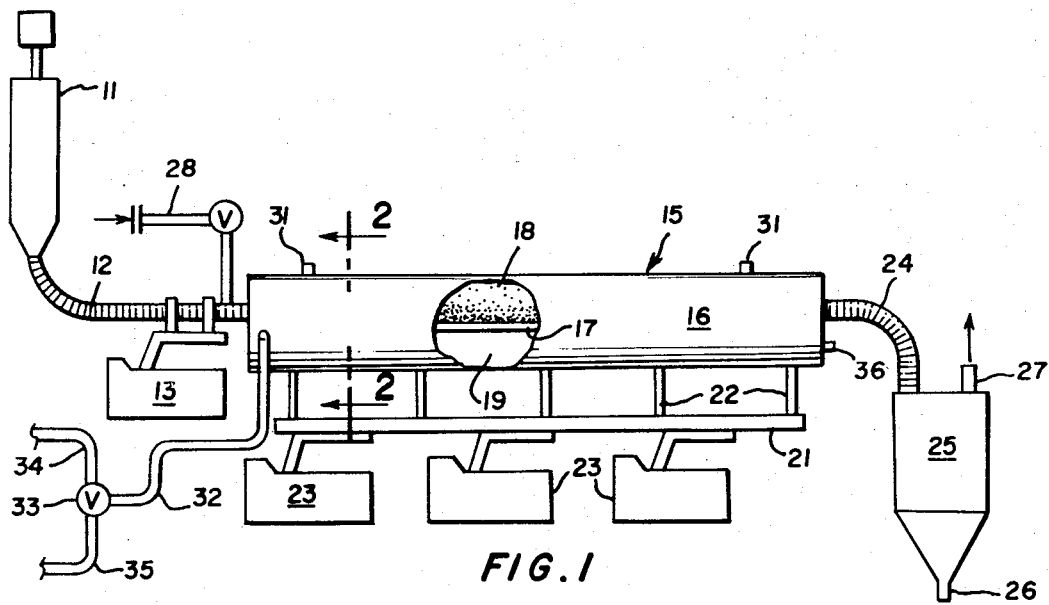
FIG. 1 is a side elevation of reactor apparatus and associated components, utilizing features of my invention and partially broken to show the arrangement of interior parts.

Referring first to FIG. 1, the reactor unit illustrated is particularly suited for use as laboratory or pilot unit and except for dimensional differences also is representative of reactor units utilized in commercial treatments. As shown, the ore to be treated and in finely divided condition is stored in a suitable receptacle such as an ore bin 11 having an outlet delivering into a tubular conduit 12 suitably coupled to a vibrator mechanism 13 which provides a controlled rate of movement to the ore feed delivered into the conduit 12. The discharge end of conduit 12 is held in sealed connection with the feed inlet 14 of reactor apparatus designated 15.

Apparatus 15 comprises an elongated hollow body or shell 16 which conveniently may be formed from tube or pipe stock of suitable composition and has its ends closed. The hollow interior of shell 16 is divided by a partition member 17 in sealed connection with its interior surface into an upper reactor chamber 18 and a lower chamber 19. Partition 17 is formed from heat-conductive material and functions as heat exchange media to provide the requisite temperature control to be described hereinafter and also is the supporting surface for the charge of material under treatment.

Shell 16 is supported in a substantially horizontal suspended position above a base support 21 by a plurality of upright rods or arms 22 extending from base 21 and connected to member 17 at intervals throughout its length. Suitable vibration mechanism, here shown as three electrical vibrator units 23, direct vibration forces to member 17 through the support structure and moves the ore charge progressively to a discharge conduit 24 in sealed connection with the end closure of shell 16 by which it is delivered into a closed receptacle 25 having a lower solids discharge outlet 26 and an upper gas outlet 27.

Figure 2:
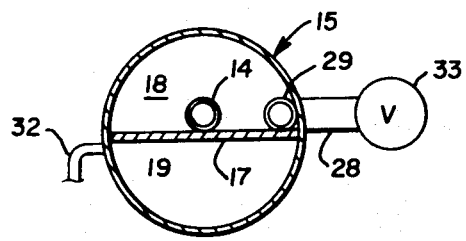
FIG. 2 is a section taken along the line 2—2, FIG. 1, and drawn to an enlarged scale.

Reactive gas from a suitable source of supply (not shown) is delivered through a valve controlled line 28 at a selected rate and passes into a distributor line 29 (FIG. 2) extending throughout most of the lengthwise extent of chamber 18 and having a series of outlets at intervals along its length for delivering small streams of gas into chamber 18 in close proximity to the charge of solids, supported on partition 17. Temperature recording devices, such as thermocouples 31, are located at spaced points in chamber 18 and provide a continuous record of prevailing temperatures in the chamber. A supply line 32 delivers heat exchange fluid into compartment 19 and has a mixing valve 33 regulating intake from a heated fluid line 34 and a cold fluid line 35 for regulating the rate of heat exchange through partition 17. A discharge outlet 36 passes spent heat exchange fluid from chamber 19.

The reactor apparatus 15 shown in FIG. 1 provides a continuous treatment in which a charge of material is moved progressively through the elongated reaction zone 18 while sealed from the atmosphere. Such movement extends from inlet 14 to the discharge conduit 24 which directs such discharge into the closed receptacle 25 and is initiated by the plurality of vibrators 23 directing vibratory forces against the heat-exchange partition 17 supporting the charge of material under treatment in the reaction zone.

Each increment of vibration directed through partition 17 causes an elevating movement of the charge of material supported by the partition with consequent loosening of the bed material and separation of discrete particles of the bed. Gas released through distributor 29 flows over the bed and fills the voids between particles so elevated providing a large amount of gas to solids contact. As the reactor gas is delivered into chamber 18 in small increments and at multiple points along its lengthwise extent, reaction is rapid and substantially complete within a short time interval after release of each such increment. The total gas release is in starvation amounts in relation to the quantity of material in the charge within the reaction zone and the gas so introduced is substantially consumed by reaction within the zone.

The repetitions of exposure of particle surfaces to gas contact and exposure of new surfaces in the progressive movement of bed material through the zone provide a considerable amount of reaction in a rather brief retention time. In addition to imparting the elevating movement to discrete particles, the vibratory forces so applied produce the impelling movement which directs the bed material progressively between inlet and discharge.

At the beginning of an operating period, the valve 33 will be actuated to deliver hot fluid from line 35 into chamber 19 to heat partition 17 until such time as the reaction in chamber 18 evolves sufficient heat to require cooling of partition 17 and reduction of reaction zone temperature. Thermocouples 31 register temperature changes in the reaction zone and when a cooling requirement is indicated, valve 33 is changed to deliver a mixture of hot and cold fluid from lines 34 and 35 or only cooling fluid from line 35 so that reaction zone temperatures will remain substantially uniform. Such temperature regulation may be manual as by operator control or may be automatic as by having actuating mechanism responsive to thermocouple determinations changing the setting of valve 33.

The treatment just described induces reactions between finely divided solids and reactive gases by controlling the temperature rate of heat transfer, rate of contact and retention time in the closed reactor, thereby eliminating the interference of solid products of reaction and inhibiting the reaction between unreacted solids and reactive gases. The intimate contact between the finely divided solids and gas in a manner which allows immediate heat transfer to or from the solids also allows immediate controlled reactions without the necessity of dilution.

Figure 4:
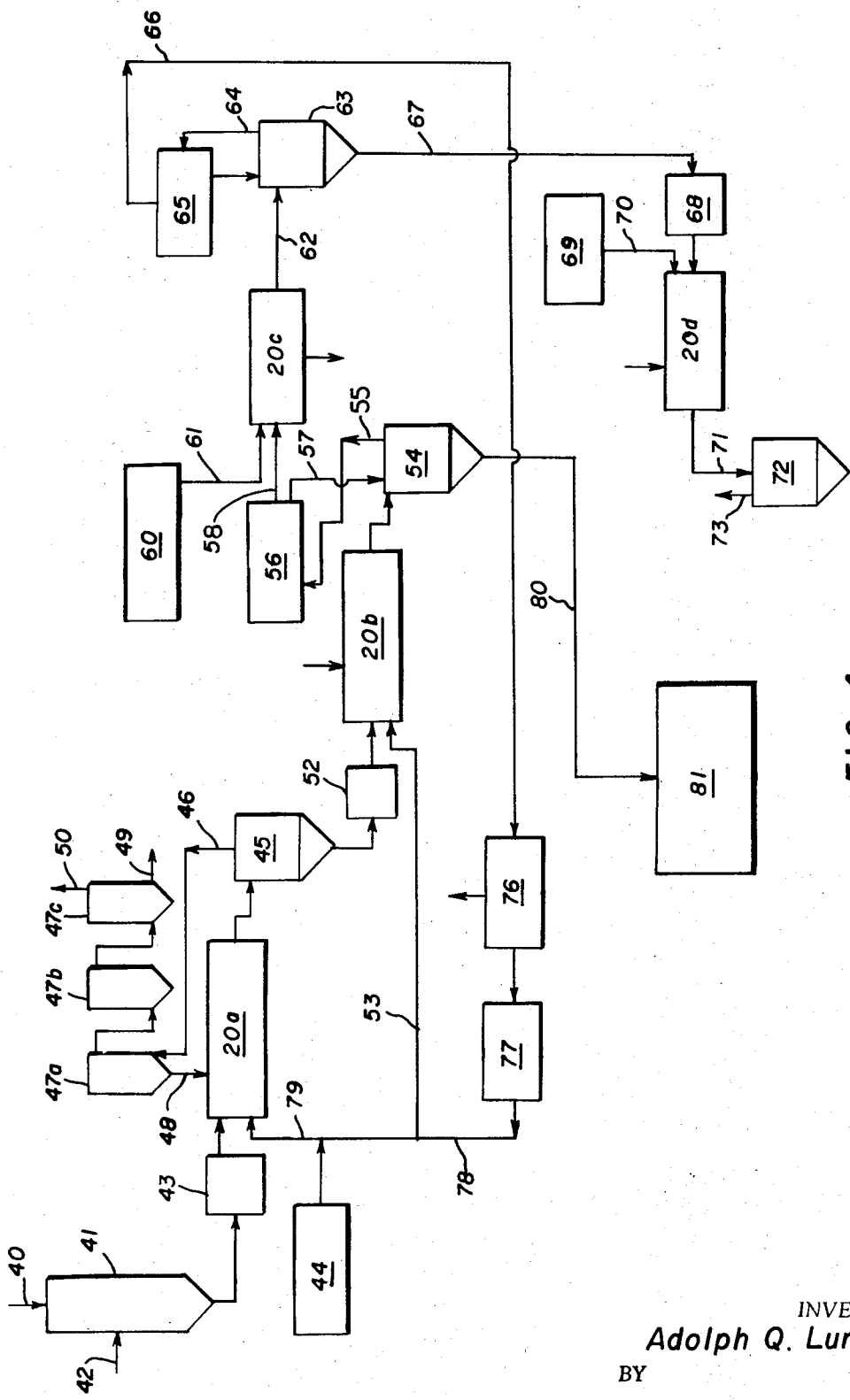
FIG. 4 is a multi-stage circuit for treating sulfide ores or concentrates.

Having thus described the arrangement of apparatus components and their functioning, certain typical treatments using such a reactor will now be described. FIG. 4 is a flow sheet representation of a typical circuit for treating iron pyrites to obtain sulfur and iron separations with recovery of other metals indicated as when sulfide ores or concentrates are the material taken for treatment. Processes for using chlorine or gaseous HCl in the extractive metallurgy of iron recognize that ferric chloride boils at a temperature (319° C.) considerably below the chlorides of metallic constituents normally associated with iron. In general $Cl_2$ is required for sulfide ores while HCl is preferred for oxidized ores.

I have discovered that it is possible to recover sulfur in pure form and separated from iron by maintaining the iron in the solid state as ferrous chloride during the time the sulfur is separated and recovered. In the next step, the ferrous chloride is converted from the solid form to gaseous form by additional chlorination which at a given temperature allows the separation of ferric chloride vapors from the metal chlorides, such as lead, zinc, silver, gold, nickel, cobalt, manganese, etc. which remain in the solid residue which is reserved for further metal recoveries and separation by known methods. The ferric chloride separated from the system is further reacted with oxygen in a third stage to oxidize the iron to oxide, thereby recovering the chlorine for introduction into the primary and secondary reactors. The ferric oxide can be treated by hydrogen or other reducing gases or reactants in a fourth reactor to reduce the oxide to pure iron powder.

The reactors shown in FIG. 4 and designated 20a, 20b, 20c and 20d are essentially the same as the reactor apparatus 15 of FIG. 1 and provide the controls of temperature, rate of heat transfer, rate of contact and retention time previously described, as well as providing the elevating movement of the charge, and the other features of the gas-solids contact and impelling movement of the charge as described. Thus, they provide a high degree of gas-solids contact and finite temperature control.

The reactant gas in chlorination is pure chlorine and the flow ratio of inlet gas to solids feed may be established selectively by metering the chlorine and weigh feeding the solids. A vital aspect of this concept is to fix the solids composition somewhere within the two-phase region $FeS$-$FeCl_2$. From a practical standpoint, it is desirable to have the FeS concentration as low as possible and just enough to insure that a vestigial amount of FeS is present at all points in the bed of the first reactor 20a. This insures that the gas phase at the exit will be sulfur with no chlorine present. The bed of the first reactor is maintained at a temperature of about 600° C. which is sufficiently below the melting point of $FeCl_2$ to avoid solids agglomeration. As long as there is any FeS in the bed, the $Cl_2$ will not react with the $FeCl_2$ to produce $FeCl_3$.

As shown in FIG. 4, an ore charge such as $FeS_2$ and designated 40 is fed to a receptacle 41 preferably an ore preheater in which heat is introduced as indicated at 42. Heated $FeS_2$ in finely divided condition is delivered into a weigh feeding device 43 by which it is fed at a controlled rate into reactor 20a of the first treatment stage. Chlorine from a chlorine storage container 44 is introduced in starvation amounts into the reactor chamber of first reactor stage 20a. Certain reactions of the treatment will be set forth hereinafter with the gaseous state designated by the symbol (g) and solid state by the symbol (s).

The reaction in reactor 20a proceeds as

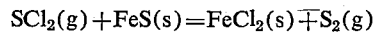

The thermodynamic equilibria for such reactions lie quantitatively to the right so that the sulfur chlorides are completely decomposed, leaving only sulfur in the vapor phase and absorbing all chlorine into the solid phase. Thus, the required conversion of $FeS_2$ is attained without undesirable side reactions or nitrogen dilution of the reactant gases. Furthermore, the net heat effect for the overall reaction $FeS(s) + Cl_2(g) = FeCl_2(s) \mp S_2(g)$ is small. Because of this, plus the excellent heat transfer conditions of reactor 20a temperature control is not a problem, Finally, the chlorination mechanism does not involve $Fe_2Cl_6$; hence deposition of Fe from gas to solid phase does not occur and particle growth nuisance is not encountered.

The $FeCl_2$ solids discharge from reactor 20a are delivered through a sealed line into a storage receptacle 45 wherein associated sulfur vapors ($S_2$, $S_4$, $S_6$, $S_8$, etc.) separate as an elevating flow and are passed through a line 46 into a sulfur condenser stage here shown as condensers 47a, 47b and 47c operating in series. Any entrained solids entering first condenser 47a are separated out as an underflow product and recycled into reactor 20a as shown at 48. The partially condensed discharge of condenser 47a is passed as feed to condenser 47b and discharge of 47b is the feed to condenser 47c. Elemental sulfur is discharged as a final product through line 49 and spent gases are vented at 50.

The solids discharge from reactor 20a is passed directly from receptacle 45 as feed to the second reactor 20b into which pure chlorine is introduced as the reactant gas at atmospheric pressure, where $FeCl_2$ is gasified. Reactor 20b is operated at 350° C. and the second reaction is slightly endothermic. The entering solids discharge from reactor 20a entering reactor 20b contains sensible heat and the reactor temperature control assists in providing the small heat requirement of this stage. As required, a small amount of unreacted $Cl_2$ is present in the off-gas and the small amount of FeS in the solids delivered through a feeder 52 into reactor 20b react to form ferric chloride and sulfur chlorides as follows:

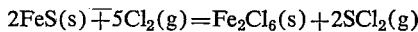

$$2FeS(s) + 5Cl_2(g) = Fe_2Cl_6(s) + 2SCl_2(g)$$

The chlorine supply to reactor 20b is delivered by a line 53 connected to the chlorine storage container 44 and the discharge of reactor 20b enters a receiving receptacle 54 for storage of the metal chloride and gangue. Gaseous components entering receptacle 54 rise through an exhaust vent into a line 55 discharging into a dust collector and precipitator unit 56 with precipitated solids thereof recycled to receptacle 54 by a line 57 and the cleaned $Fe_2Cl_6$ is delivered by another line 58 into the reactor 20c.

Said gas entering reactor 20c is reacted therein with pure oxygen delivered from an oxygen supply container 60 at approximately 850° C. to oxidize the iron to $Fe_2O_3$ and release the $Cl_2$ for recycle with a very small amount of $SO_2$ to the first reactor 20a. Sufficient oxygen is added through the line 61 supplying reactor 20c to convert all the iron into some form of iron oxide but the reaction is somewhat starved to insure that no oxygen is present in the off-gas delivered to the discharge line 62 excepting the small amount of $SO_2$ referred to above. This is to insure minimal loss of sulfur as $SO_2$ in the first reactor 20a. The line 62 discharges into a closed $Fe_2O_3$ storage receptacle 63 and the gas content delivered to receptacle 63 rises to enter a line 64 discharging into a dust collector or precipitator 65 with the clean gas passing therefrom through a recycle line 66 for eventual return to reactor 20a. The $Fe_2O_3$ in receptacle 63 is fed continuously through a line 67 into a feeder 68 which delivers it at a controlled rate into fourth reactor 20d. Hydrogen or other reducing reagent from a hydrogen storage container 69 is delivered through a line 70 into reactor 20d to provide an excess amount of hydrogen which is reacted at a temperature between 760° C. and 850° C., causing the iron to be reduced to pure metal powder and $H_2O$ vapor as follows:

$$Fe_2O_3 + 3H_2 = 2Fe + 3H_2O$$

The iron so produced passes from reactor 20d through a discharge line 71 into an iron powder storage receptacle 72 from which the $H_3O$ vapors are vented to atmosphere as shown at 73.

The precipitated dust in precipitator 65 is delivered into a recycle line 75 for return to the $Fe_2O_3$ storage receptacle 63 and the cleaned off-gas delivered into line 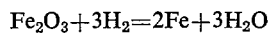 66 as previously described is discharged into a chlorine cooler 76 connected to a blower 77 which discharges into a header line 78 connected to supply line 53 and the branch line 79 through which the chlorine is originally introduced from storage container 44 as the reactive gas in reactor 20a. This arrangement also permits replenishing gas losses in container 44 and provides the reactive gas for reactors 20a and 20b.

The metal chlorides and gangue delivered into receptacle 54 from reactor 20b are stored until collected in sufficient quantity for discharge through a line 80 for delivery into a metal recovery section 81 as referred to hereinbefore. The treatment of the material delivered into section 81 may be by any of the methods well known in the trade and forms no part of the present invention.

Figure 3:
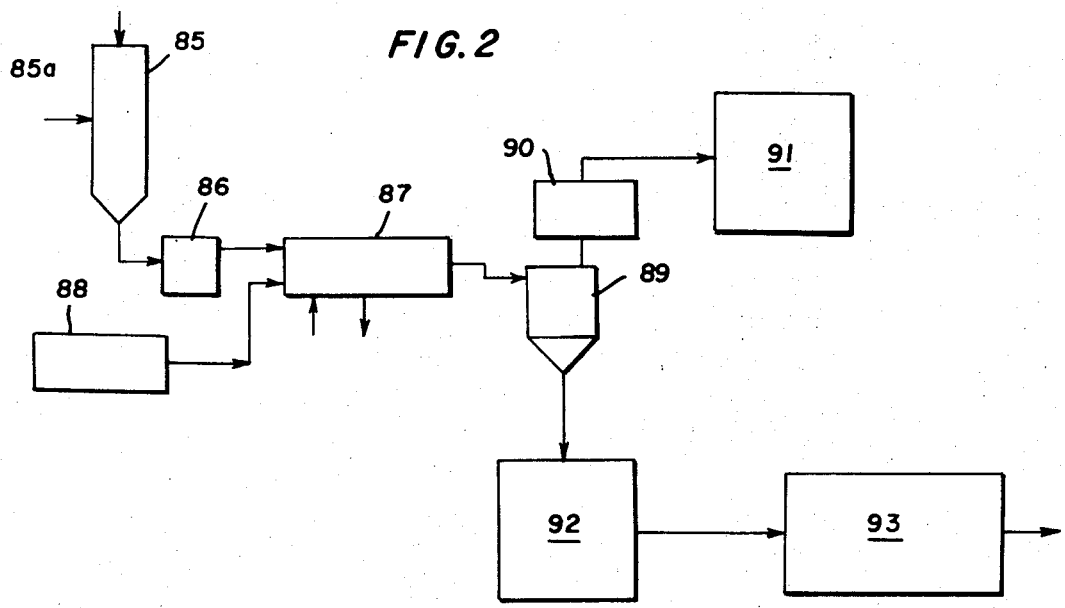
FIG. 3 is a flow sheet of a sulfation or oxidation treatment particularly suited for treatment of sulfide ores or concentrates.

FIG. 3 illustrates another circulating arrangement for the treatment of sulfide ores or concentrates, particularly suited for applying sulfation or oxidation treatments to such compositions. The ore fed in finely divided condition is first delivered into a storage receptacle 85 which preferably is a preheater with a heat input introduced at 85a. A feeder 86 delivers the ore from preheater 85 at a controlled rate into a reactor 87 of the general type shown in FIG. 1 and oxygen from oxygen storage 88 also is delivered as the reactive gas input to reactor 87 to produce the desired oxidation treatment with the sulfur content passing from the treatment in gaseous state as $SO_2$ and $SO_3$ while the metallic components passing into the closed receptacle 89 as calcine are discharged therefrom as an underflow product while the gas is elevated through a dust collector 90 and then passes as feed to a sulfuric acid plant 91.

The calcine underflow from receptacle 89 is discharged into a leach plant 92 where the iron is insoluble in weak sulfuric acid and the mineral values are soluble, excepting lead, silver and gold which are recovered from the residues in a metal recovery stage 93 into which the discharge of leach plant 92 is introduced. In the treatment of complex oxide ores, the reactor would be the same but the gas reactions would require different conditions such as the ($FeCl_2$+FeS) couple to provide the proper reactions. The apparatus also may be used as a treatment system for complex ores by utilizing the reducing power of the $FeCl_2$+FeS couple obtained from adding sulfide ores and chlorine to the reactor.

Where the expression iron pyrites and similar materials is used in the specification, it is intended to designate materials containing iron pyrites or compositions of the general formula $FeCl_2$ or FeS alone or in association with other compositions.

In the preceding description of the operating procedures which may be utilized in the practice of my invention, provision is made for variations in procedure according to the nature of the composition of the material taken for treatment. In the broad concept of reacting gases and solids, the description of the structural arrangement shown in FIG. 1 and the operating procedure relating thereto indicates a substantial permissible variation particularly as to the temperature control features and also as to the selection of the reactive gas and the quantity of such gas introduced into the treatment.

Changes and modifications may be availed of within the spirit and scope of the hereunto appended claims.

I claim:

1. The method of reacting particulate solids material with a gaseous reagent, which comprises moving a charge of such a particulate material through an elongated reaction zone having impervious heat exchange supporting surfaces and containing a gaseous reagent sealed from the atmosphere, said movement being a progressive movement between a point of feed introduction at one end and a point of discharge at an opposite end of said zone initiated by increments of a vibratory action imparted continuously to the heat exchange supporting surfaces along which said solids travel throughout the course of said progressive movement, said vibratory action thereby causing elevating movement of the particles of the charge away from the supporting surface in each increment of vibration applied to said supporting surfaces, and inducing continuous flow of the contained gaseous reagent about and through the charge of moving particles in each elevating movement throughout the entire course of travel between inlet and outlet so as to react exposed particle surfaces with the gas at each point of contact in said movement.

2. A method as defined in claim 1, in which the contained gaseous reagent fills the unoccupied space of said reaction zone.

3. The method of reacting particulate solids material with a gaseous reagent, which comprises moving a charge of such a particulate material through an elongated reaction zone having impervious heat exchange supporting surfaces and containing a gaseous reagent sealed from the atmosphere, said movement being a progressive movement between a point of feed introduction at one end and a point of discharge at an opposite end of said zone initiated by increments of a vibratory action imparted continuously to the heat exchange supporting surfaces along which said solids travel throughout the course of said progressive movement, said vibratory action thereby causing elevating movement of the particles of the charge away from the supporting surface in each increment of vibration applied to said supporting surfaces, inducing continuous flow of the container gaseous reagent about and through the charge of moving particles in each elevating throughout the entire course of travel between inlet and outlet so as to react exposed particle surfaces with the gas at each point of contact in said movement, and varying the reaction zone temperature during the treatment by changing the temperature of said heat exchange surfaces.

4. The method of reacting particulate solids material with a gaseous reagent, which comprises moving a charge of such a particulate material through an elongated reaction zone having impervious heat exchange supporting surfaces and containing a gaseous reagent sealed from the atmosphere, said movement being a progressive movement between a point of feed introduction at one end and a point of discharge at an opposite end of said zone initiated by increments of a vibratory action imparted continuously to the heat exchange supporting surfaces along which said solids travel throughout the course of said progressive movement, said vibratory action thereby causing elevating movement of the particles of the charge away from the supporting surface in each increment of vibration applied to said supporting surfaces, inducing continuous flow of the contained gaseous reagent about and through the charge of moving particles in each elevating movement throughout the entire course of travel between inlet and outlet so as to react exposed particle surfaces with the gas at each point of contact in said movement, and controlling the reaction zone temperature by changing the temperature of said heat exchange surfaces in accordance with measured determinations of prevailing temperatures in said zone.

5. The method of reacting particulate solids material with a gaseous reagent, which comprises moving a charge of such a particulate material through an elongated reaction zone having impervious heat exchange supporting surfaces and containing a gaseous reagent sealed from the atmosphere, said movement being a progressive movement between a point of feed introduction at one end and a point of discharge at an opposite end of said zone initiated by increments of a vibratory action imparted continuously to the heat exchange supporting surfaces along which said solids travel throughout the course of said progressive movement, said vibratory action thereby causing elevating movement of the particles of the charge away from the supporting surface in each increment of vibration applied to said supporting surfaces, inducing continuous flow of the contained gaseous reagent about and through the charge of moving particles in each elevating movement throughout the entire course of travel between inlet and outlet so as to react exposed particle surfaces with the gas at each point of contact in said movement, and raising the temperature of said heat exchange surfaces when temperatures in said zone are below a predetermined value.

6. A method as defined in claim 4, in which the temperature of said heat exchange surfaces is lowered when temperatures in said zone are above a predetermined value.

7. The method of separating the iron and sulfur constituents of iron pyrites and manufactured materials of similar composition which comprises introducing such a material in finely divided condition at a controlled rate into a reaction zone containing a gaseous reagent sealed from the atmosphere and having impervious heat exchange supporting surfaces subjected to vibratory forces directing solids material entering said zone to continuous progressive movement from a point of introduction at one end to a point of discharge at an opposite end, said vibratory action thereby causing elevating movement of the charge away from the supporting surfaces in each increment of vibration applied to said supporting surfaces, introducing chlorine in small increments in gaseous state at spaced intervals along the course of advancing movement for penetrating contact with elevating solids along said course, maintaining a predetermined reaction temperature in said zone by heat exchange action, discharging sulfur components from said zone in gaseous state, discharging metallic components as a solids residue, and subjecting the gaseous sulfur components to condensation to form elemental sulfur.

8. The method of separating the iron and sulfur constituents of iron pyrites and manufactured materials of similar composition which comprises introducing such a material in finely divided condition at a controlled rate into a reaction zone containing a gaseous reagent sealed from the atmosphere and having impervious heat exchange supporting surfaces subjected to vibratory forces directing solids material entering said zone to continuous progressive movement from a point of introduction at one end to a point of discharge at an opposite end, said vibratory action being high amplitude, low frequency vibrations normal to the direction of travel of the granular solids, thereby causing elevating movement of the charge away from the supporting surfaces in each increment of vibration applied to said supporting surfaces, introducing oxygen in small increments in gaseous state at spaced intervals along the course of advancing movement for penetrating contact with elevating solids along said course, maintaining a predetermined reaction temperature in said zone by heat exchange action, discharging sulfur or chlorine components from said zone in gaseous state, discharging metallic components as a solids residue, and subjecting the discharged gaseous sulfur or chlorine components to condensation.

9. The method of separating the iron and sulfur constituents of iron pyrites and manufactured materials of similar composition which comprises introducing such a material in finely divided condition at a controlled rate into a reaction zone sealed from the atmosphere and subjected to vibratory forces directing solids material entering said zone to repeated elevating action and advancing movement through said zone, introducing chlorine in small increments at spaced intervals along the course of advancing movement for penetrating contact with elevating solids along said course, maintaining a predetermined reaction temperature in said zone by heat exchange action, discharging sulfur components from said zone in gaseous state, discharging metallic components as a solids residue, subjecting the gaseous sulfur component to condensation for recovery of elemental sulfur, passing the $FeCl_2$ solids discharge from said reactor as feed to a second similar reactor into which pure chlorine is introduced as the reactive gas in small increments at atmospheric pressure, maintaining the temperature in said second reaction zone at about 350° C., discharging the gas and solids from said second reactor stage into a closed receptacle, collecting the gaseous $Fe_2Cl_6$ passing from said receptacle for oxidation reaction in a third stage reaction zone, and passing the residual solids from said receptacle to a metal recovery stage.

10. The method of separating the iron and sulfur constituents of iron pyrites and manufactured materials of similar composition which comprises passing such material in finely divided condition through a succession of treatment zones, introducing such material into a first reaction zone together with chlorine in starvation amounts thereby forming $FeCl_2$ as a solids residue and $S_2$ as a gaseous discharge of the reactor, passing the gaseous discharge through a condensation treatment to recover elemental sulfur as a product of such treatment, introducing the residual solids of the first reactor zone into a second reactor zone in which pure chlorine is introduced as the reactant gas at atmospheric pressure thereby forming $Fe_2Cl_6$ as a gaseous product and $S_2Cl_2$ as a gaseous component if some FeS is unreacted in the first zone delivering the gaseous discharge of the second reactor stage as feed to a third reactor stage in which sufficient oxygen is introduced to convert all the iron into some form of iron oxide with chlorine recovered from the gaseous discharge for recycle to the chlorine introduction stages of the treatment, and introducing residual solids of the third reactor stage into a fourth reactor stage in which a reducing agent is introduced as the reactant agent thereby reducing the iron content to a purified powder residue with $H_2O$ vapors produced as the gaseous component for discharge to the atmosphere.

11. A process as defined in claim 10 in which the reducing agent is hydrogen.

References Cited

UNITED STATES PATENTS

| 1,746,945 | 2/1930 | Hyde | 75—91X |
| 1,929,502 | 10/1933 | Levy et al. | 75—112X |
| 1,937,661 | 12/1933 | Meyer | 75—112 |
| 1,943,337 | 1/1934 | Mitchell | 75—112X |
| 2,296,498 | 9/1942 | Brassert | 75—91 |
| 3,049,422 | 8/1962 | Wolcott | 75—63 |
| 3,140,940 | 7/1964 | Keith | 75—26 |

L. DEWAYNE RUTLEDGE, Primary Examiner

E. L. WEISE, Assistant Examiner

U.S. Cl. X.R.

23—252; 75—9, 26, 112, 113